(12) United States Patent
Jang

(10) Patent No.: US 7,102,694 B2
(45) Date of Patent: Sep. 5, 2006

(54) APPARATUS AND METHOD FOR ELIMINATING AFTERIMAGE STATE

(75) Inventor: Geun-Sik Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 10/162,086

(22) Filed: Jun. 5, 2002

(65) Prior Publication Data

US 2003/0011719 A1 Jan. 16, 2003

(30) Foreign Application Priority Data

Jul. 11, 2001 (KR) ................ 2001-41561

(51) Int. Cl.
*H04N 5/68* (2006.01)
(52) U.S. Cl. .................................. 348/607
(58) Field of Classification Search ........... 348/607, 348/377–382, 730, 634; 345/112, 212, 213
See application file for complete search history.

(56) References Cited

U.S. PATENT DOCUMENTS

| | | | | | |
|---|---|---|---|---|---|
| 4,549,217 | A | * | 10/1985 | Sendelweck | 348/380 |
| 4,722,005 | A | * | 1/1988 | Ledenbach | 348/173 |
| 5,229,860 | A | * | 7/1993 | Kido et al. | 348/625 |
| 5,880,719 | A | * | 3/1999 | Kikinis | 345/212 |
| 6,313,878 | B1 | * | 11/2001 | Jankowiak | 348/377 |
| 6,563,495 | B1 | * | 5/2003 | Griepentrog | 345/212 |
| 6,628,247 | B1 | * | 9/2003 | Toffolo et al. | 345/31 |
| 2001/0009411 | A1 | * | 7/2001 | Kusanagi | 345/93 |
| 2002/0171770 | A1 | * | 11/2002 | Wendt et al. | 348/634 |
| 2003/0076332 | A1 | * | 4/2003 | Choi | 345/581 |
| 2004/0135768 | A1 | * | 7/2004 | Gu | 345/156 |
| 2005/0104874 | A1 | * | 5/2005 | Koh | 345/204 |

FOREIGN PATENT DOCUMENTS

| | | |
|---|---|---|
| JP | 2000-10550 | 1/2000 |
| KR | P2000-0013620 | 8/1998 |

OTHER PUBLICATIONS

"*Notice to Submit Response*" issued by Korean Intellectual Property Office dated on Jun. 18, 2003 and English language translation of the Notice to Submit Response.

Video-Technology Magazine's *Video Format Resolutions* that identifies various formats and their pixel resolution (http://www.videotechnology.com/0904/formats.htm).

(Continued)

*Primary Examiner*—Paulos M. Natnael
(74) *Attorney, Agent, or Firm*—Robert E. Bushnell, Esq.

(57) ABSTRACT

An apparatus and method for eliminating an afterimage state occurring on a liquid crystal display (LCD) panel. The apparatus includes a memory for storing an input video signal, a data comparator for comparing data read from or written into the memory, a controller for outputting a previously stored RGB (red, green, and blue) signal for on screen display (OSD) if it is determined according to the comparison result of the data comparator that the data read from or written into the memory are maintained in the same state for a predetermined time, a signal processing unit for converting the input video signal into a desired format by writing the input video signal into the memory and reading the input video signal from the memory and for outputting a converted video signal, and displaying a moving picture, instead of the converted video signal, on an LCD if the RGB signal for OSD is output from the controller.

16 Claims, 4 Drawing Sheets

OTHER PUBLICATIONS

Manifest Technology's PC Video Article on Video Format Conversion: AVI and Quicktime and MPEG (Aug. 1999) by Douglas Dixon which also identifies several video formats, and describes converting them from one format to another, with no mention of such conversion being based on a 'video level' (http://www.manifest-tech.com/media_pc/vid_fmt_cvt.htm.

Howstuffworks' *How Video Formatting Works* which includes identification of well known video formats NTSC, PAL and SECAM. Note that the discussion of what video formatting is not based on a 'video level' (http://entertainment.howstuffworks.com/video-format.htm/printable).

Avid DS Nitris Support Center's *Legalizing Video Levels Using the Color Corrector* which describes 'video formats' and also describes 'video levels'. Accordingly, the two terms are not synonymous. That is, 'video level' does not mean the same thing as 'video format'. (http://www.avid.com/onlinesupport/supportcontent.asp?browse=&productID=94&contentID=8606).

Avid Xpress Pro Support Center's document entitled NVIDIA Display Card Settings Can Cause Video Level Shift When Playing/Stopping Video describes 'brightness' in terms of 'video levels'. (http://www.avid.com/onlineSupport/supportcontent.asp?productID=97&contentID=7487&browse=).

Ken Stone's FinalCut Pro Web Site provided a document entitled Video Levels in Final Cut Pro By Graeme Nattress, which describes various video levels for analog and digital video formats. Note that there is no teaching that changing a 'video level' changes a 'video format' (http://www.kenstone.net/fcp_homepage/video_levels_nattress.html).

National Instruments web page provides a document entitled Video Signal Measurement Fundamentals wherein it is disclosed that "video levels define the levels and ranges for the different parts of the video signal. The unit used to define video levels is the IRE (Institute of Radio Engineers)." (http://zone.ni.com/devzone/conceptd.nsf/webmain/0E5DAD8917692B5D86256F3500549509?opendocument&node=dz00000_us).

* cited by examiner

APPARATUS AND METHOD FOR ELIMINATING AFTERIMAGE STATE

CLAIM OF PRIORITY

This application makes reference to, incorporates the same herein, and claims all benefits accruing under 35 U.S.C. § 119 from my application A APPARATUS AND METHOD FOR ELIMINATING AFTERIMAGE STATE filed with the Korean Intellectual Property Office on Jul. 11, 2001 and there duly assigned Serial No. 41561/2001.

BACKGROUND OF THE INVENTION

1. Field of the Invention

The present invention relates to a display apparatus and method, and more particularly, to an apparatus and method for eliminating an afterimage state occurring on a liquid crystal display (LCD) panel.

2. Description of the Related Art

A liquid crystal display (LCD) can be used in personal computers, workstations, and televisions. The LCD scans a liquid crystal display panel according to a video signal and displays a still picture or moving picture on the liquid crystal display panel. The LCD does not react to a video signal very quickly, and thus, an afterimage of a previous still screen which was present for a long time, such as a screen displaying text, remains when the previous still screen is changed into another screen.

As text broadcasting has been increasing since the beginning of the multimedia age, television broadcasting requires high still picture quality as well as high moving picture quality.

FIG. 1 is a block diagram illustrating a structure of an exemplary computer to explain a screen saver. Referring to FIG. 1, the computer includes an external inputting unit 100 such as a mouse or keyboard, a main frame 111, and a monitor 112. The monitor 112 is a display device comprised of a cathode-ray tube (CRT) or liquid crystal display (LCD). A microprocessing unit (MPU) 111-1 of the main frame 111 sends a video signal stored in a memory 111-2 to a video signal processing unit 111-3 which processes the video signal and sends it back to the MPU 111-1 which then outputs the processed video signal to the monitor 112, thereby preventing an afterimage state if there is no input for a certain time after the key inputting unit 100, such as a mouse or keyboard, is checked when controlling the monitor 112.

A screen saver function is included in the exemplary computer so as to prevent an afterimage state. A system or software for preventing such an afterimage state is not implemented in a television using an LCD. Text broadcasting as well as moving picture broadcasting is increasing, and thus, a system or software for solving the afterimage state in a television using an LCD is required.

SUMMARY OF THE INVENTION

To solve the above problems, it is a first objective of the present invention to provide an apparatus for eliminating an afterimage state occurring on a liquid crystal display (LCD) panel.

It is a second objective of the present invention to provide a method for eliminating an afterimage state occurring on an LCD panel.

To achieve the first objective, according to one aspect of the present invention, there is provided an apparatus for eliminating an afterimage state. The apparatus includes a memory for storing an input video signal, a data comparator for comparing data read from the memory or written into the memory, a controller for outputting a previously stored RGB (red, green, and blue) signal for on screen display (OSD), if it is determined according to the comparison result of the data comparator, that data read from the memory or written into the memory are maintained in the same state for a predetermined time, a signal processing unit for converting the input video signal into a desired format by writing the input video signal into the memory and reading the input video signal from the memory and for outputting the converted video signal and displaying a moving picture if there is no input video signal and the RGB signal for OSD is transferred from the controller, and a LCD for displaying the processed signal.

In order to achieve the first objective, according to another aspect of the present invention, there is provided an apparatus for eliminating an afterimage state. The apparatus includes a memory for storing an input video signal, a data comparator for comparing data read from the memory or written into the memory, a controller for putting a LCD television in a standby mode and outputting a power off control signal, if it is determined according to the comparison result of the data that data read from the memory or written into the memory are maintained in the same state for a predetermined time, a signal processing unit for converting the input video signal into a desired format by writing the input video signal into the memory and reading the input video signal from the memory and for outputting the converted video signal and stopping a signal processing operation if the power off control signal is input to the controller, and a LCD for displaying the processed signal and stopping a display operation if the power off control signal is input to the controller.

In order to achieve the second objective, according to one aspect of the present invention, there is provided a method for eliminating an afterimage state in driving an LCD television. The method comprising the steps of (a) comparing data read from a memory for storing an input video signal or comparing data written into the memory, and (b) displaying a previously stored RGB (red, green, and blue) signal for on screen display (OSD) on a LCD if it is determined according to the comparison result that the data read from the memory or written into the memory are maintained in the same state for a predetermined time.

In order to achieve the second objective, according to another aspect of the present invention, there is provided a method for eliminating an afterimage state in driving an LCD television. The method includes the steps of (a) comparing data read from a memory for storing an input video signal or comparing data written into the memory, (b) putting the LCD television in a standby mode if it is determined according to the comparison result that the data read from the memory or written into the memory are maintained in the same state for a predetermined time.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
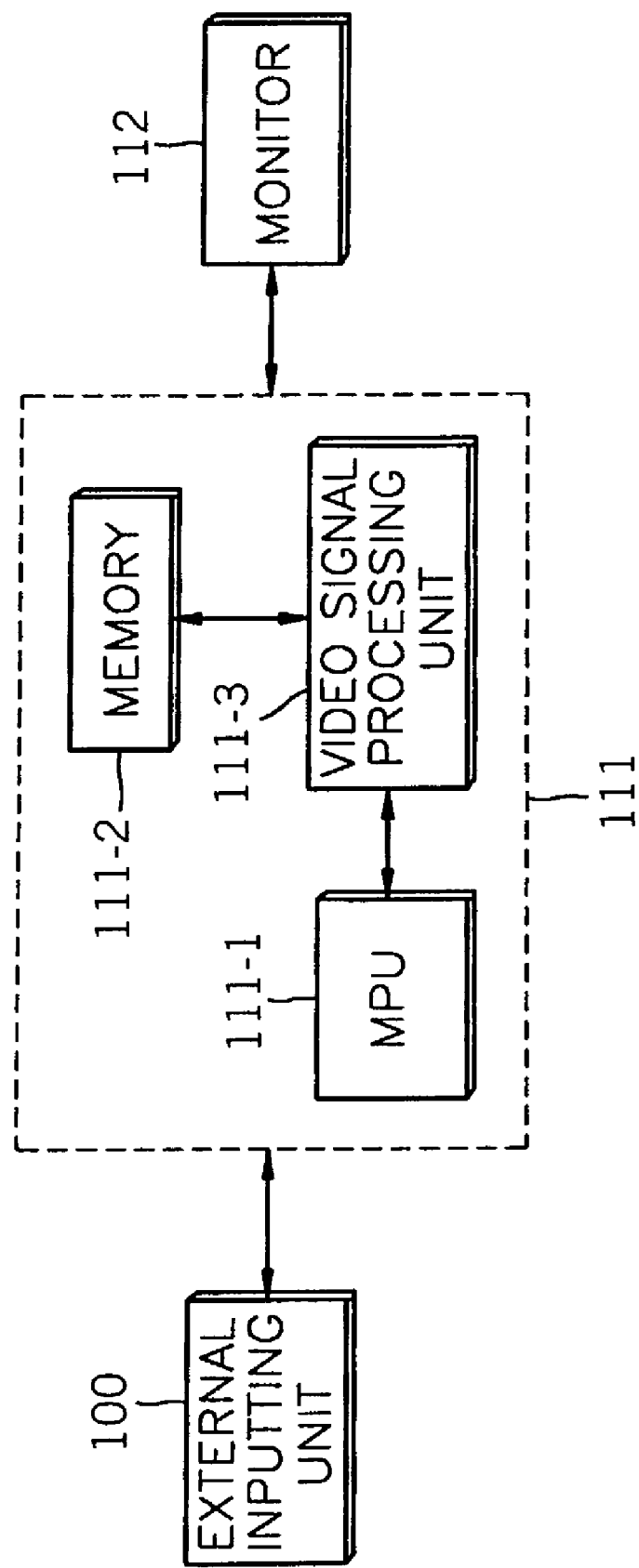
FIG. 1 is a block diagram illustrating a structure of an exemplary computer to explain a screen saver.
Figure 2:
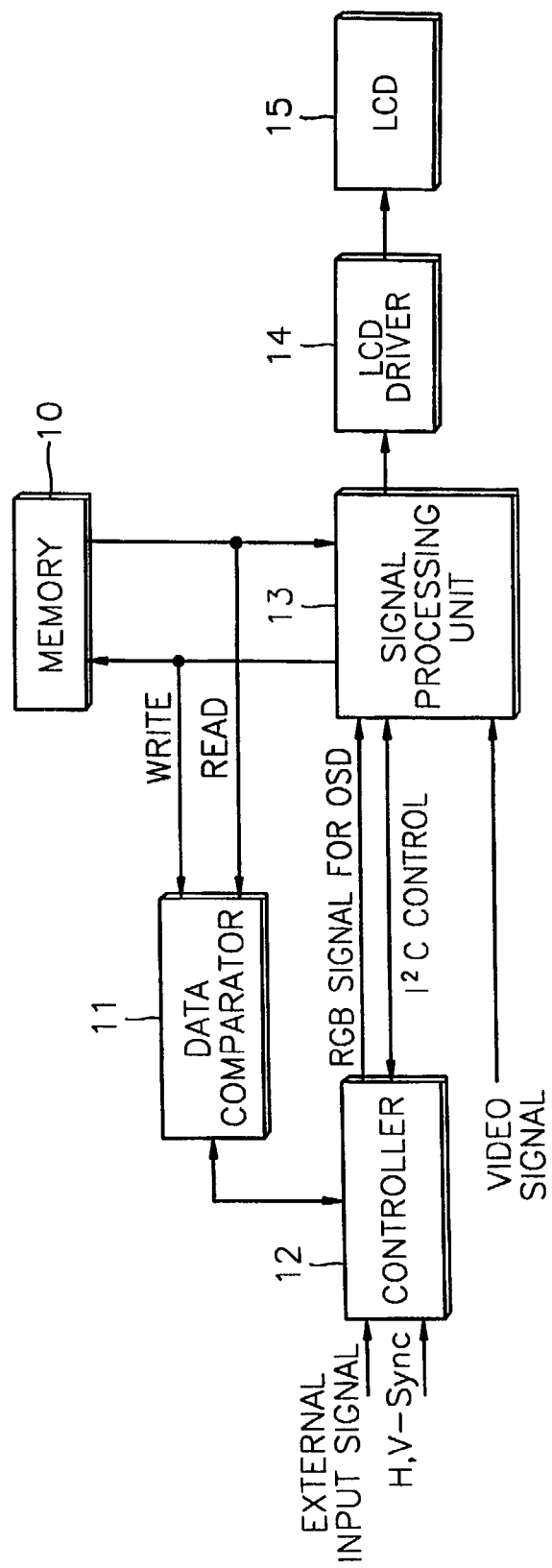
FIG. 2 is a block diagram illustrating a structure of an apparatus for eliminating an afterimage state according to the present invention.

FIG. 2 is a block diagram illustrating a structure of an apparatus for eliminating an afterimage state in an LCD television according to the present invention. As shown in FIG. 2, a memory 10 stores a formatted video signal, a data comparator 11 compares data read from the memory 10 or compares data written into the memory 10, and a controller 12 outputs a previously stored RGB (red, green, and blue) signal for on screen display (OSD), or puts the LCD television in a standby mode and outputs a power off control signal if it is determined according to the comparison result of the data comparator 11 that data read from memory 10 is the same as the data being written into the memory 10 and are maintained in the same state for a predetermined time. Also, a signal processing unit 13 converts an input video signal into a desired format by writing the input video signal into the memory 10 and reading the stored input video signal from the memory 10. The signal processing unit 13 outputs the converted video signal and controls the display of a moving picture on an LCD 15 if there is no input video signal and the RGB signal for OSD is transferred from the controller 12 to signal processing unit 13. Further, the signal processing unit 13 stops a signal processing operation if the power off control signal is input to the controller 12. A LCD driver 14 drives LCD 15 so that a signal output from the signal processing unit 13 is displayed on LCD 15.

The memory 10 stores a frame of video data. The frame of video data stored in the memory 10 is written into or read from memory 10 by the signal processing unit 13.

The data comparator 11 compares the data written into the memory 10 by the signal processing unit 13 after a predetermined time interval with data previously written into the memory 10. For example, the data comparator 11 compares data written at one sixtieth of a second with data written at two sixtieths of a second and outputs the result of the comparison. In other words, the data comparator 11 compares a frame of video data written at one sixtieth of a second with a frame of video data written at two sixtieths of a second and outputs the result of the comparison.

Further, the data comparator 11 compares data read from the memory 10 after a predetermined time interval with data previously read from the memory 10. For example, the data comparator 11 compares data read at one sixtieth of a second with data read at two sixtieths of a second and outputs the result of the comparison. In other words, the data comparator 11 compares a frame of video data read at one sixtieth of a second with a frame of video data read at two sixtieths of a second and outputs the result of the comparison.

The controller 12 outputs a previously stored RGB (red, green, and blue) signal for on screen display (OSD), or puts the LCD television in a standby mode and outputs a power off control signal if it is determined, according to the comparison result of the data comparator 11, that data read from or written into the memory 10 are maintained in the same state for a predetermined time. The controller 12 is a television microcomputer that controls blocks necessary for signal processing by using an I²C bus. OSD RGB output ports are included in the controller 12 so that text or graphics may be displayed on the LCD 15.

The predetermined time for which the data read from or written into the memory 10 must be maintained in the same state in order for the controller 12 to put the LCD television in a standby mode and output a power off control signal is set by a user. In a case where data read from or written into the memory 10 are maintained in the same state for the predetermined time set by a user and the controller 12 outputs the RGB signal for OSD, the RGB for OSD is output from a memory such as read only memory (ROM) (not shown) included in the controller 12 and may be a moving picture or moving text. The RGB for OSD may also be one of plural selectable OSDs as selected by a user. The memory for the RGB for OSD may also be a non-volatile RAM and the user may input desired text for storage therein.

It is desired that the controller 12 change the display position of the RGB for OSD by using input horizontal and vertical synchronous signals, wherein the input horizontal and vertical synchronous signals received by controller 12 are externally or internally generated.

In a case where the data read from or written into the memory 10 are maintained in the same state for the predetermined time set by a user and the controller puts the LCD television in a standby mode, the power of all blocks excluding the controller 12 is turned off, and the LCD television is in a standby state for receiving an external signal. The standby mode reduces unnecessary power consumption.

The signal processing unit 13 processes all signals of the LCD television, converts formats of all the signals by using memory 10, and converts data so that the RGB signal for OSD of the controller 12 is received and displayed on the LCD 15. The signal processing unit 13 converts an input video signal into a desired format by writing the input video signal into the memory 10 and reading the stored input video signal from the memory 10, outputs the converted video signal, and displays a moving picture on the LCD 15 if there is no input video signal and the RGB signal for OSD is transferred from the controller 12, or stops a signal processing operation, if the power off control signal is input to the controller 12.

The LCD driver 14 drives the LCD 15 so that the signal output from the signal processing unit 13 is displayed on the LCD 15.

Figure 3:
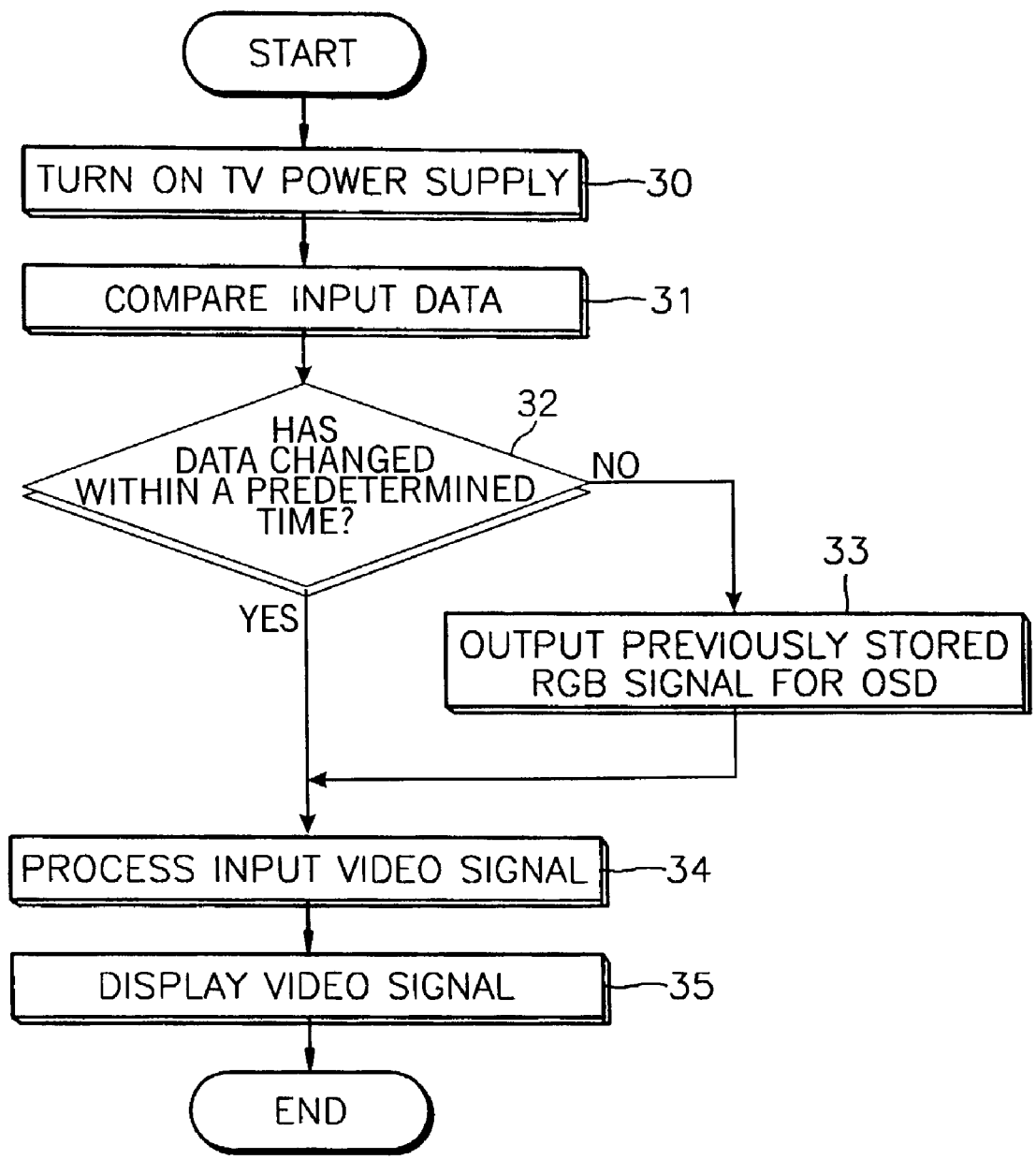
FIG. 3 is a flow chart illustrating a method for eliminating an afterimage state according to a first embodiment of the present invention.

FIG. 3 is a flow chart illustrating a method for eliminating an afterimage state according to a first embodiment of the present invention. Referring to FIG. 3, the method includes the steps of turning on a TV power supply (step 30), comparing input data (step 31), determining whether the data has changed (step 32), outputting a previously stored RGB signal for OSD (step 33), processing an input video signal (step 34), and displaying the video signal (step 35).

Figure 4:
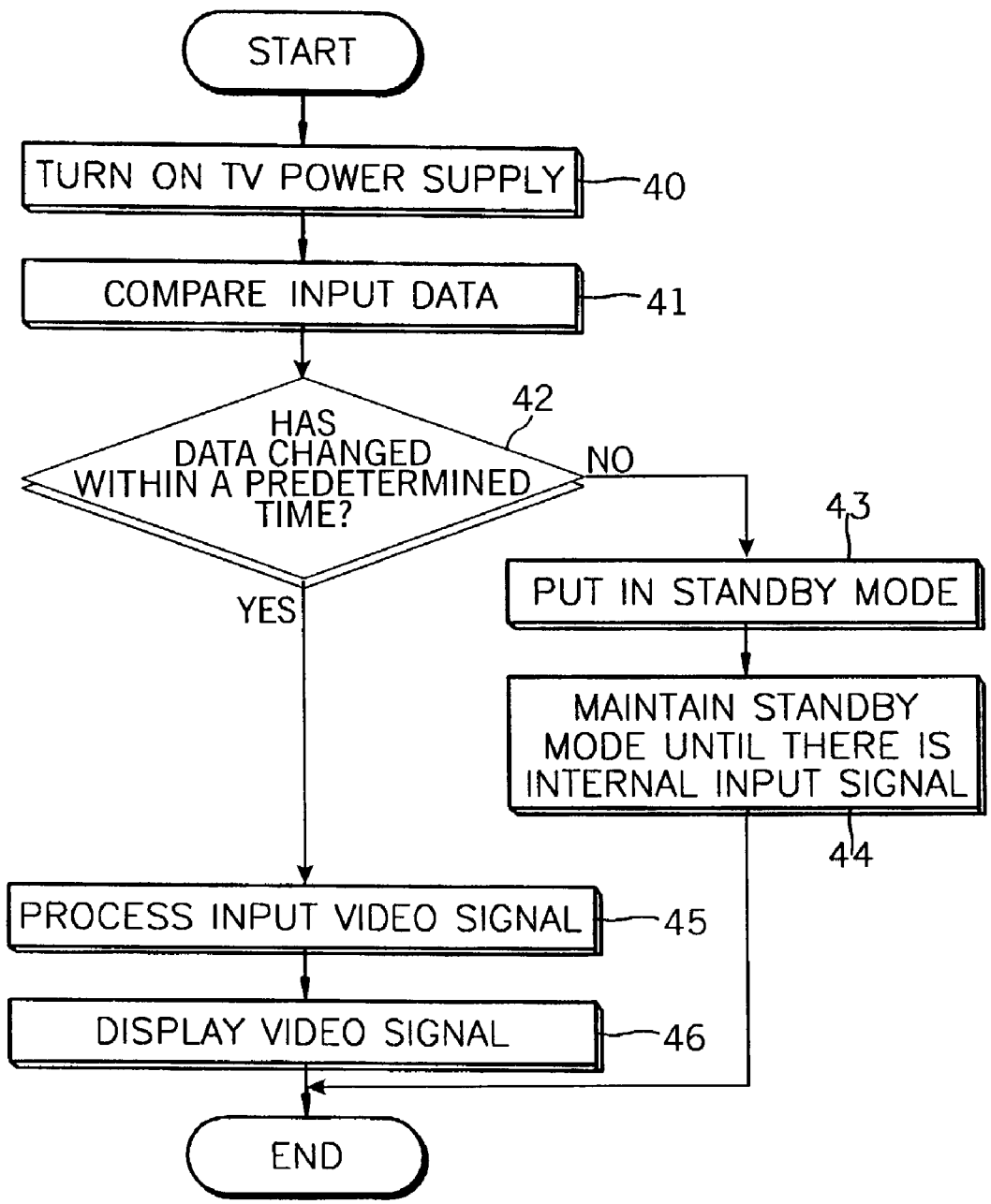
FIG. 4 is a flow chart illustrating a method for eliminating an afterimage state according to a second embodiment of the present invention.

FIG. 4 is a flow chart illustrating a method for eliminating an afterimage state according to a second embodiment of the present invention. Referring to FIG. 4, the method includes the steps of turning on a TV power supply (step 40), comparing input data (step 41), determining whether the data has changed (step 42), putting an LCD television in a standby mode (step 43), maintaining the standby mode until there is an external input signal (step 44), processing an input video signal (step 45), and displaying the video signal (step 46).

The method for eliminating an afterimage state will be described in detail below with reference to FIGS. 3 and 4.

The method for eliminating an afterimage state includes a method for outputting an RGB signal for OSD on the basis of FIG. 3, a method for putting an LCD television in a standby mode on the basis of FIG. 4, and a mixture of the methods.

In the method for outputting an RGB signal for OSD, a user turns on a TV power supply for viewing in step 30.

Data written into or read from the memory 10 are compared after a time interval in step 31. For example, data written at one sixtieth of a second are compared with data written at two sixtieths of a second, and the result of the comparison is output. For another example, data read at one sixtieth of a second are compared with data read at two sixtieths of a second, and the result of the comparison is output.

In step 32, it is determined whether there was a change in the data based the comparison result. More specifically, controller 12 determines, according to the comparison result, whether the data read from or written into the memory 10 are maintained in the same state for a predetermined time. In such a case, the predetermined time may be set by a user.

In a case where the data are maintained in the same state for the predetermined time, a previously stored RGB signal for OSD is output from controller 12 to signal processing unit 13 in step 33.

The RGB signal for OSD may be called a screen saver and may be a moving picture or moving text. The RGB signal for OSD may also be set by a user, and the position of the RGB signal for OSD can be changed on a screen.

In a case where the result of the comparison indicates that the data has changed within the predetermined time, an input video signal is processed by signal processing unit 13 in step 34.

The processed video signal is displayed on the screen in step 35.

In the method for putting the LCD television in a standby mode as shown in FIG. 4, a user turns on a TV power supply for viewing in step 40.

Data written into or read from the memory 10 are compared after a time interval in step 41. For example, data written at one sixtieth of a second are compared with data written at two sixtieths of a second, and the result of the comparison is output. For another example, data read at one sixtieth of a second are compared with data read at two sixtieths of a second, and the result of the comparison is output.

In step 42, it is determined whether there was a change in the data based the comparison result. More specifically, controller 12 determines, according to the comparison result, whether the data read from or written into the memory 10 are maintained in the same state for a predetermined time. In such a case, the predetermined time may be set by a user.

In a case where the data are maintained in the same state for the predetermined time, the LCD television is put in a standby mode in step 43.

That is, the predetermined time for which the data read from or written into the memory 10 must be maintained in the same state is set by a user. In a case where data read from or written into the memory 10 are maintained in the same state for the predetermined time set by a user, an LCD television is put in a standby mode. If the LCD television is put in the standby mode, the power of all blocks excluding the controller 12 is turned off, and the LCD television is converted into a standby state for receiving an external signal. The standby mode reduces unnecessary power consumption.

The standby mode is maintained until there is an external input signal applied to controller 12 in step 44. Such an external input signal can be generated from a number of peripheral devices connected to the LCD television, such as, but not limited to, a signal from a remote controller.

In a case where the result of the comparison indicates that the data has changed within the predetermined time, an input video signal is processed by signal processing unit 13 in step 45.

The processed video signal is displayed on the screen in step 46.

As described above, according to the present invention, an afterimage state occurring on a LCD screen can be prevented, thereby improving image quality.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for eliminating an afterimage state on a screen of a liquid crystal display (LCD) television, said apparatus comprising:
   a memory for storing an input video signal;
   a data comparator for comparing data read from the memory or written into the memory;
   a controller for outputting a previously stored RGB (red, green, and blue) signal for on screen display (OSD) if it is determined, according to the comparison result of the data comparator, that the data read from the memory or written into the memory are maintained in the same state for a predetermined time;
   a signal processing unit for converting the input video signal into a desired format by writing the input video signal into the memory and reading a stored video signal from the memory and for outputting a converted video signal when said controller does not output the RGB signal for OSD; and
   an LCD for displaying the converted video signal.

2. The apparatus of claim 1, wherein the predetermined time is set by a user.

3. The apparatus of claim 1, wherein the RGB signal for OSD is a moving picture or a picture of text, and is selected by a user.

4. The apparatus of claim 1, wherein the controller changes the position of the RGB signal for OSD displayed on the LCD by using input horizontal and vertical synchronous signals.

5. An apparatus for eliminating an afterimage state on a screen of a liquid crystal display (LCD) television, said apparatus comprising:
   a memory for storing an input video signal;
   a data comparator for comparing data read from the memory or written into the memory;
   a controller for putting the LCD television in a standby mode and outputting a power off control signal if it is determined, according to the comparison result of the data comparator, that the data read from the memory or written into the memory are maintained in the same state for a predetermined time;
   a signal processing unit for converting the input video signal into a desired format by writing the input video signal into the memory and reading the input video signal from the memory and for outputting a converted video signal when said controller does not put said LCD television in the standby mode, and stopping a signal processing operation of the signal processing unit in response to the power off control signal when said controller puts said LCD television in the standby mode; and an LCD for displaying the converted video signal when said controller does not put said LCD television in the standby mode, and stopping a display operation in response to the power off control signal when said controller puts said LCD television in the standby mode.

6. The apparatus of claim 5, wherein the controller is the only element of the LCD television that is not turned off when said controller puts said LCD television in the standby mode.

7. The apparatus of claim 5, wherein the predetermined time is set by a user.

8. The apparatus of claim 5, wherein said controller is responsive to an external input signal for converting said LCD television from the standby mode to a normal mode.

9. A method for eliminating an afterimage state in driving a liquid crystal display (LCD) television, the method comprising the steps of:

comparing data read from or written into a memory, said memory storing an input video signal, and generating a comparison result;

determining whether the read or written data has changed, based on said comparison result, within a predetermined time;

processing the input video signal for display on an LCD of said LCD television, by converting the input video signal into a desired format by writing said input video signal into said memory and reading said input video signal from said memory to output a converted video signal, when it is determined that the data read from or written into the memory has changed within said predetermined time.

10. The method of claim 9, further comprising a step of: displaying a previously stored RGB (red, green, and blue) signal for on screen display (OSD) on the LCD instead of processing the input video signal when it is determined that the data read from or written into the memory has not changed within said predetermined time.

11. The method of claim 9, further comprising a step of: putting the LCD television in a standby mode and outputting a power off control signal when it is determined that the data read from or written into the memory has not changed within said predetermined time.

12. The method of claim 9, wherein the predetermined time is set by a user.

13. The method of claim 10, wherein the RGB signal for OSD is a moving picture or a picture of text and is selected by a user.

14. The method of claim 10, wherein the position of the RGB signal for OSD displayed on the LCD can be changed.

15. The method of claim 11, further comprising a step of: cutting off power to all elements of the LCD television, except a controller, in response to the power off control signal.

16. The method of claim 15, further comprising a step of: changing said standby mode to a normal mode in which power is reapplied to said elements, when said controller detects an externally applied input signal.

* * * * *